United States Patent [19]

Shirato

[11] 4,270,343
[45] Jun. 2, 1981

[54] METHOD AND APPARATUS FOR RECOVERY OF ENERGY FROM BLAST FURNACE EXHAUST GAS

[75] Inventor: Takeshi Shirato, Tokyo, Japan

[73] Assignee: Mitsui Engineering & Shipbuilding Co., Ltd., Tokyo, Japan

[21] Appl. No.: 943,796

[22] Filed: Sep. 19, 1978

[30] Foreign Application Priority Data

Dec. 5, 1977 [JP] Japan .............................. 52-145188

[51] Int. Cl.³ .............................................. F02C 7/00
[52] U.S. Cl. ................................... 60/39.05; 60/39.58
[58] Field of Search .................. 60/39.08, 39.05, 39.53, 60/39.58, 39.59

[56] References Cited

U.S. PATENT DOCUMENTS

| | | | |
|---|---|---|---|
| 2,669,091 | 2/1954 | Schutte | 60/39.05 |
| 2,677,235 | 5/1954 | Secord | 60/39.05 |
| 3,818,707 | 6/1974 | Boudard et al. | 60/39.05 |

*Primary Examiner*—Louis J. Casaregola

*Attorney, Agent, or Firm*—Armstrong, Nikaido, Marmelstein & Kubovcik

[57] ABSTRACT

The present invention relates to a method and apparatus for recovering energy from a blast furnace exhaust gas by utilizing an axial-flow turbine. According to the method of the present invention, a blast furnace exhaust gas is first passed through a wet scrubber to remove dusts and form a saturated gas, and low temperature water is sprayed to the saturated gas to add condensed mists to the gas. According to this method, adhesion of dusts to a turbine can be effectively prevented. When large nozzles and large moving blades are used for the turbine for use in practising this method, adhesion of dusts and erosion of nozzles and moving blades can be effectively prevented. This energy recovery method can be practised very advantageously by using an axial-flow turbine in which the gas flow-out direction at the nozzle outlet is made in agreement with the gas flow-out direction at the moving blade outlet to always impart to the gas a swirling speed around the axial center of the turbine, so that the dusts and mists are shaken off from the gas.

7 Claims, 13 Drawing Figures

L1: critical value of erosion
L2: quantity of erosion
L3: critical value of $t_d/c$

METHOD AND APPARATUS FOR RECOVERY OF ENERGY FROM BLAST FURNACE EXHAUST GAS

BACKGROUND OF THE INVENTION

(1) Field of the Invention

The present invention relates to a method for recovering energy possessed by a blast furnace exhaust gas at a high efficiency by utilizing an axial-flow turbine, and also to an axial-flow turbine that is used for practising this method.

When a blast furnace is operated, a large quantity of an exhaust gas is generated. The temperature of this exhaust gas is considerably high and the gas has a considerable pressure. Namely, the blast furnace exhaust gas has thermal and mechanical energies. If such energies are discharged into open air together with the exhaust gas, they are wastefully lost. Thus it is desirable to recover such energies effectively.

The present invention is to provide a method and apparatus for recovering energy from a blast furnace exhaust gas by utilizing an axial-flow turbine, in which energy can be recovered at a high efficiency while preventing adhesion of dusts or clogging with dusts.

(2) Description of the Prior Art

Various attempts have heretofore been made to recover energy from a blast furnace exhaust gas. For example, one of such conventional energy recovery methods is disclosed in the specification of U.S. Pat. No. 3,818,707.

These conventional methods for recovering pressure energy from a blast furnace exhaust gas are divided into two types; one type using a centrifugal turbine and the other type using an axial-flow turbine.

One of disadvantages observed when a blast furnace exhaust gas is utilized as an operation fluid for a turbine is that since large quantities of dust are contained in the exhaust gas, if the exhaust gas is directly fed into the turbine, the dust will adhere to nozzles to cause such troubles as clogging, and the operation efficiency is reduced. Accordingly, the blast furnace exhaust gas is fed to a turbine after the dust has been removed therefrom.

In case of the method using a centrifugal turbine, an exhaust gas is first scrubbed to remove dust therefrom and the gas is saturated with water vapor and fed to the centrifugal turbine to drive it. Since in the centrifugal turbine the turbine blades are fixed more tightly than in an axial-flow turbine and nozzle blades are not provided in general, the centrifugal turbine is advantageous in that adhesion of dust is not conspicuous. However, the centrifugal turbine system is large in size and also equipment expenses are very large. Further, the operation efficiency is relatively low and it is very difficult to recover energy at a high recovery ratio.

The method using an axial-flow turbine is substantially advantageous over the method using a centrifugal turbine in the point that the size of the turbine is small and the operation efficiency is high. However, this method using an axial-flow turbine still involves various disadvantages. For example, dust adheres to nozzles (stationary blades) and moving blades to reduce the operation efficiency and cause such troubles as clogging of the nozzles. Further, when dust adheres to the moving blades, good balance cannot be maintained in the moving blades and such troubles as vibrations are caused. In some case, masses of the dust adhering to the nozzles or moving blades are separated therefrom and impinge against moving blades or other members located downstream to damage or destroy them, and there is a risk that a serious accident can take place.

In the conventional method using an axial-flow turbine, in order to prevent adhesion of dust, a blast furnace exhaust gas is passed through a wet scrubber, and the gas is heated to dry dusts and in this state the gas is introduced into the turbine. Accordingly, it is necessary to dispose a device for partial combustion of a blast furnace exhaust gas or a heat exchanger, and the equipment becomes complicated and the thermal efficiency is accordingly reduced.

The state of adhesion of dust to nozzles or other members of a turbine is varied according to such factors as the quantity of dust, the composition of the dust, the amount of water and the flow rate of the gas. Even after a blast furnace exhaust gas is treated with, for example, a wet dust precipitator (venturi scrubber), the gas contains about 100 mg/Nm$^3$ of dust and 3 to 5 g/Nm$^3$ of water. The dust in this state is very likely to adhere to the interior of the turbine. On the other hand, dust in the dry state is more erosive to nozzles and moving blades than dust surrounded by water and the degree of abrasion is higher. Therefore, in this case, any particular means is disposed to prevent erosion.

OBJECTS OF THE INVENTION

It is a primary object of the present invention to provide a method for recovering pressure energy at a high efficiency from dust-containing gases, especially blast furnace exhaust gases, by using an axial-flow turbine having essentially a higher capacity than a centrifugal turbine.

Another object of the present invention is to provide a method for recovering energy from dust-containing gases by utilizing an axial-flow turbine using these gases as operation fluids, in which adhesion or accumulation of dust on nozzles and moving blades of the turbine is effectively prevented and the capacity of the axial-flow turbine can be sufficiently exerted stably for a long time without occurrence of erosion of the nozzles, moving blades and the like to thereby utilize essential advantages of the axial-flow turbine.

Still another object of the present invention is to provide an apparatus for removing dust and mists contained in an operation fluid effectively in the interior of a turbine, especially in front stages thereof.

A further object of the present invention is to provide an apparatus for catching promptly dust and mists separated from an operation fluid and discharging them to the outside.

SUMMARY OF THE INVENTION

The present invention is characterized in that in recovering energy from a blast furnace exhaust gas, such operation conditions are provided that dust contained in the exhaust gas hardly adheres to nozzles or moving blades. More specifically, the present invention is characterized in that an exhaust gas is passed through a wet scrubber and water maintained at a temperature lower than that of the gas is fed to the scrubbed exhaust gas in the saturated state so that the dust contained in the gas are surrounded by a water layer.

According to a preferred embodiment, a dust-containing gas is saturated with water vapor, then water (cooling water) maintained at a temperature lower than that of the gas is continuously added to the saturated gas in an amount corresponding to 0.5 to 5% by weight of the flow rate of the saturated gas, and the gas is then introduced into an axial-flow turbine.

Further, in accordance with the present invention, there is provided an axial-flow turbine having such a structure that dust and mists contained in the above-mentioned saturated exhaust gas introduced in the turbine can easily be separated therefrom and discharged to the outside.

The state of adhesion of dust to nozzles (stationary blades) and moving blades of a turbine is varied according to such factors as the quantity of dust, the composition of dust, the amount of water and the speed of the gas passing through the interior of the turbine. For example, in the case where an operation fluid is a blast furnace exhaust gas, even after the gas has departed from a wet dust precipitator (venturi scrubber), the gas still contains about 100 mg/Nm$^3$ of dust and 3 to 5 g/Nm$^3$ of water. When energy is recovered from the gas in this state, the dust is kept under such conditions that it is very likely to adhere to the turbine, and in this case, adhesion of dust to nozzles of the first stage is extreme.

When dust are removed from an exhaust gas by utilizing a wet dust precipitator such as venturi scrubber, thermal energy possessed by the exhaust gas is lost for elevation of the temperature of water, and therefore, it is important to reduce this loss of energy to a minimum level.

Research has been performed on influences of the amount and temperature of water to be added to an exhaust gas on adhesion of dust to a turbine, and as a result, it was found that when water is added to the exhaust gas so that the water content is maintained within a certain range, adhesion of dust can be prevented.

More specifically, if prior to introduction of a dust-containing gas saturated with water vapor into a turbine, water maintained at a temperature lower than that of the gas is sprayed to the gas in a large amount, namely in an amount corresponding to 0.5 to 5% by weight of the flow rate of the gas, there can be attained a prominent effect of preventing adhesion of dust.

A preferred amount of water to be sprayed to the gas saturated with water vapor varies depending on the quantity of dust, the composition of dust, the flow rate of the gas, the temperature of the gas and the degree of saturation of the gas. Dust adheres especially readily to nozzles of the first stage because the temperature reduction is insufficient and a sufficient time is not reserved for condensation of water vapor to mists. In view of this fact, it is important that water should be sprayed in an amount corresponding to 0.5 to 5% by weight of the flow rate of the gas saturated with water vapor. If the amount of water sprayed is smaller than 0.5% by weight of the flow rate of the gas, the effect of preventing adhesion of dust is reduced, and if the amount of water sprayed is larger than 5% by weight of the flow rate of the gas, the amount of mists generated in the turbine is increased and a problem of erosion becomes serious.

Also the temperature of water sprayed to the saturated gas is important. When the temperature of water is higher than the temperature of the gas, namely when warm water is sprayed, even if the amount of water is maintained within the above-mentioned range, the effect of preventing adhesion of dust is lowered.

It is practically difficult to examine how adhesion of dust to nozzles or moving blades of a turbine can be prevented by the above-mentioned spray of water. However, from results of experiments conducted under various conditions, it is construed that in the case where water added is completely converted to vapor and it floats in the gas, the dust removal effect is low, and good results are ordinarily obtained when water envelops the dust as nuclei to form mists.

As pointed out hereinbefore, dust per se hardly adheres to the interior of a turbine in many cases, but when water vapor is present in the gas, adhesion is promoted. On the other hand, if the amount of water is further increased, the dust becomes unlikely to adhere.

In the conventional method disclosed in the above-mentioned U.S. Pat. No. 3,818,707, even if the degree of saturation in the gas saturated with water vapor is elevated, there hardly takes place a phenomenon that dust is surrounded by thin films of water, and therefore, the function of preventing adhesion of dust to the interior by these thin films of water is not significant in this conventional method.

The most characteristic feature of the present invention is that there are produced such conditions that dust particles as nuclei are surrounded by thin films of water. When dust is fed to the interior of a turbine in the form of micro-spheres of a double structure comprising a dust particle nucleus covered with a thin film layer of water, the water film exerts a kind of cushioning action and the dust particle is prevented from impinging and adhering to the inner wall face of the turbine and the dust particle is kept in the state floating in the water layer. Further, since the inertia of fine mists formed through the above-mentioned procedures is very small, they flow in the rows of blades substantially in the same manner as the gas flows. Namely, the fine mists flow quite exactly along concave and convex faces of nozzles and hence, adhesion of the mists to the nozzles and the like is effectively prevented.

In order to practise the present invention effectively, it is necessary to discharge such dust surrounded by water films and mists outside a casing of the turbine as soon as possible. If the dust and mists are allowed to further flow together with the gas, as the recovery of energy is advanced (the gas flows to the latter stage in the turbine), the quantity of mists is increased to cause such undesirable phenomena as erosion, vibrations and reduction of the energy recovery efficiency.

In view of the foregoing, the turbine to be used in practising the present invention is required to have the following properties. Namely, wet dust is not allowed to adhere to and accumulate on the interior of the turbine, erosion or the like is not caused by water drops added, and unnecessary mists can easily be caught and the dust and mists can promptly be discharged outside the turbine. In order to satisfy these requirements, it is necessary to use an axial-flow turbine having a specific structure.

In a preferred embodiment of the axial-flow turbine that is used in the present invention, the speed of the gas flown from a first nozzle is adjusted below 200 m/sec, especially in the range of from 140 to 180 m/sec, whereby erosion is effectively prevented and mists containing dusts therein are allowed to flow very smoothly. Further, swirling streams with the turbine axis being as the center are produced in the gas, whereby a centrifugal force is generated in the gas and by this centrifugal force, dust surrounded by water layers and unnecessary mists having a large size are pushed forward to the inner wall face of the casing and are guided to the outside through discharge grooves or slits formed on the inner wall face. Thus, the dust and mists are promptly discharged from the interior of the turbine and adhesion of the dust to nozzles and moving blades of the first stage can be prevented especially effectively.

In an ordinary axial-flow turbine, the speed of the gas jetted from a first nozzle is higher than 200 m/sec. In the present invention, this speed is positively lowered as pointed out above, and it also is important that the flow-out angle of the gas from the first nozzle should be adjusted to 50° to 60°.

The axial-flow turbine of the present invention is further characterized in that the nozzles and moving blades, especially the first nozzle and moving blade, the ratio of the height to the chord length is controlled to 0.7 to 1.5, namely large-size nozzles and moving blades are employed. With this size arrangement, the thickness of the rear edge in the nozzle and moving blade is adjusted to 6 to 12 mm.

Another characteristic feature of the axial-flow turbine of the present invention is that the peripheral speed of the top end of the moving blade is made lower than in ordinary axial-flow turbines and especially, the peripheral speed of the top end of the first moving blade is controlled to 150 to 230 m/sec.

Still another structural feature of the axial-flow turbine of the present invention is that a groove or slit crossing the axis of the turbine substantially at a right angle is formed on the periphery of a gas passage and dust and mists are effectively caught by such groove or slit.

An ordinary axial-flow turbine is designed so that the flow-out direction of the gas at the nozzle outlet is made different from the flow-out direction of the gas at the moving blade outlet, i.e., the nozzle of the subsequent stage, so as to attain a maximum flow efficiency. Therefore, in the ordinary axial-flow turbine, there are not produced swirling streams turning in the same direction in the gas passing through the turbine. In the present invention, swirling streams turning in the same direction are positively produced in the gas to generate a centrifugal force in the gas, and by utilizing this centrifugal force the dust and mists can be effectively separated from the gas.

As pointed out hereinbefore, the most characteristic feature of the present invention resides in that after a dust-containing gas discharged from a blast furnace has been saturated with water vapor, prior to introduction of the saturated gas into an axial-flow turbine, water maintained at a temperature lower than that of the saturated gas is continuously sprayed to the saturated gas in an amount corresponding to 0.5 to 5% by weight of the flow rate of the saturated gas, whereby because of not only the washing action but also the cooling action of mists of the so sprayed water, supersaturated water vapor in the gas is condensed prior to entrance into the axial-flow turbine and condensed water is caused to wrap the dust therein. If such a specific large amount of water is thus sprayed to the saturated gas upstream of the axial-flow turbine, adhesion and accumulation of dust to the blades of the turbine can be effectively prevented. Further, various erosion-preventing contrivances are made to nozzles and blades so that bad influences are not brought about by mists generated by spraying of a large amount of water and the nozzles and blades can exert their functions sufficiently in the presence of a large quantity of mists without shortening of their lives. In other words, although it has been considered that since in a conventional axial-flow turbine a minimum amount of water necessary for attaining prevention of adhesion and accumulation of dust is larger than a maximum allowable amount of water not causing erosion, it is impossible to practically apply the conventional axial-flow turbine to recovery of energy from a blast furnace exhaust gas, according to the present invention the difficulties involved in the conventional technique can be completely eliminated and it is possible to recover energy from a blast furnace exhaust gas effectively by utilizing an axial-flow turbine.

DETAILED DESCRIPTION OF THE PREFERRED EMBODIMENTS

Figure 1:
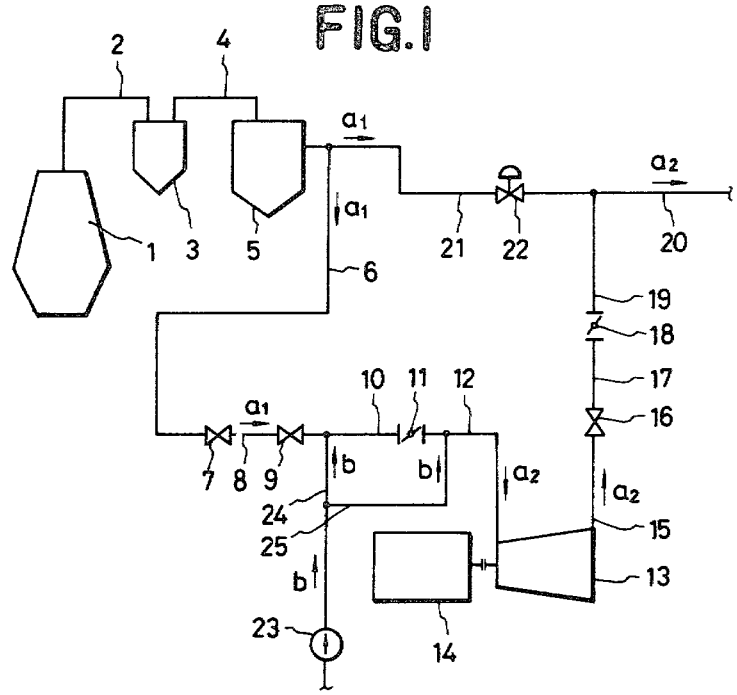
FIG. 1 is a systematic view illustrating one embodiment of the apparatus of the present invention for recovering energy from a blast furnace exhaust gas.

Referring to FIG. 1 which is a systematic view showing an embodiment of the apparatus of the present invention for recovering energy from a blast furnace exhaust gas, an exhaust gas discharged from a blast furnace 1 is introduced into a dust catcher 3 through a duct 2, and it is then introduced into a venturi scrubber, i.e., a wet dust precipitator 5, through a duct 4.

In the wet dust precipitator 5, the blast furnace gas is first saturated with water vapor. For example, when the blast furnace gas is ordinary one having a temperature of about 150° C. and a pressure of about 2 atmospheres (gauge), the gas is cooled by evaporation of water in the wet dust precipitator 5 and converted to a gas $a_1$ saturated with water vapor having a temperature of about 60° C.

The saturated gas a₁ passes through a duct 6, an inlet dummy valve 7, a duct 8, an emergency inlet shut-off valve 9, a duct 10, a governor valve 11 and a duct 12 and flows into an axial-flow turbine 13. This turbine 13 is connected to a driven mechanism 14 and acts as a power source for driving the mechanism 14.

According to the present invention, while the saturated gas a₁ is passing through the ducts 10 and 12, water maintained at a temperature lower than the temperature of the gas a₁ is continuously sprayed to the gas a₁ to convert it to a supersaturated gas a₂. The gas a₂ discharged from the axial-flow turbine 13 is guided through a duct 15, an outlet dummy valve 16, a duct 17, an outlet shut-off valve 18 and a duct 19 and then discharged outside through a duct 20.

In the above-mentioned flow system of the blast furnace gas, according to the present invention, before the gas a₁ saturated in the wet dust precipitator 5 enters into the axial-flow turbine 13, a predetermined amount of water is continuously sprayed to the gas a₁. For this purpose, a pump 23 is disposed in the flow system. Namely, in order to add sprayed water streams b to the saturated gas a₁ upstream of the axial-flow turbine 13, the pump 23 is connected to the duct 10 through a duct 24 and to the duct 12 through a duct 25. In the embodiment shown in FIG. 1, in order to wash the governor valve 11, sprayed water streams b are applied to the duct 10 upstream of the governor valve 11. Application of the sprayed water streams b to the duct 10 may be omitted and the streams b may be applied to the duct 25 alone or to any other part upstream of the axial-flow turbine 13.

According to the present invention, by the cooling action of the mists of the sprayed water streams b, condensation of water vapor in the saturated gas a₁ is caused to occur and dust particles as nuclei are surrounded by thin layers of water formed by condensation of water vapor.

For better illustration of the present invention, the state where adhesion of dust to the nozzle or moving blade of the turbine is prevented will now be described.

(1) In an axial-flow turbine, dusts having a small particle size (less than 1μ), namely fumes of metal oxides and sulfides formed by evaporation and condensation in a blast furnace, adhere and accumulate in not only concave face sides of nozzles but also convex face sides of another nozzles (back faces of blades). It has been elucidated that such adhesion and accumulation are caused by impingement of high speed metal particles and so-called OH-bonds.

Since the particle size of mists generated in mere spraying of water is relatively large, they can hardly exert their cleaning actions to the convex faces (back faces of blades) of nozzles because of the separation effect owing to the force of the inertia. Accordingly, adhesion and accumulation of dusts in these areas are promptly promoted, often resulting in clogging of the nozzles with the dusts. We made investigations on this undesirable phenomenon and found that in order to exert the cleaning action even to these areas, it is necessary to reduce the particle size of mists. Namely, it was found that a size of water mists formed by an ordinary water sprayer is too large, and in order to attain the above object, the presence of fine mists having a small particle size about 1μ) formed by condensation of water vapor in the supersaturated gas caused by cooling of the gas by spraying of water maintained at a temperature lower than the temperature of the gas is indispensable.

Figure 2:
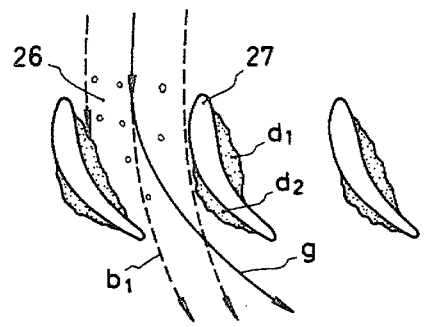
FIG. 2 is a view illustrating the state of adhesion of dust to a nozzle.

As a result of experiments made by use, it was confirmed that dust adhering to a convex face portion of a blade 27 of a nozzle 26 as shown in FIG. 2 are about 1μ or smaller. In order to cause mists of cooling water to arrive at dust d, it is necessary to travel the mists along a course similar to the course along which the dust has been conveyed. For this purpose, the size of the mists should be as small as about 1μ. The relative humidity of the gas treated in the wet dust precipitator is about 100%. Accordingly, if this gas is cooled only slightly, it is possible to generate mists having such a small particle size.

According to the present invention, mists having a small particle size are thus formed and they flow along a line b₁ which is not completely the same as the flow line of the gas indicated by solid line g in FIG. 2 but very similar thereto. Thus, they exert functions of washing away not only dust d₁ adhering to the concave face of the blade 27 but also dust d₂ adhering to the convex face of the nozzle 27.

As will be apparent from the foregoing illustration, if the sprayed water stream b₁ of mists having a small particle size is caused to flow along a course similar to the flying course of dust d, adhesion and accumulation of dust d on the convex face of the blade 27 constituting the nozzle 26 can be prevented.

(2) When cooling water is sprayed to the gas saturated with water vapor, condensation of water vapor takes place, and at this point, water drops are formed with dust particles having a small size being as the nuclei. In other words, the dust particles are surrounded by water films. Accordingly, the above-mentioned OH bonds become ineffective and water films act as buffer members diminishing shocks on high speed impingement of dust to the nozzle and the like. Therefore, adhesion of dust to the convex face of the nozzle can be prevented.

The amount of water sprayed for removal of dust adhering to the nozzle blade is determined so that the lower limit is one showing a substantial adhesion preventing effect and the upper limit is one not causing erosion.

Figure 3:
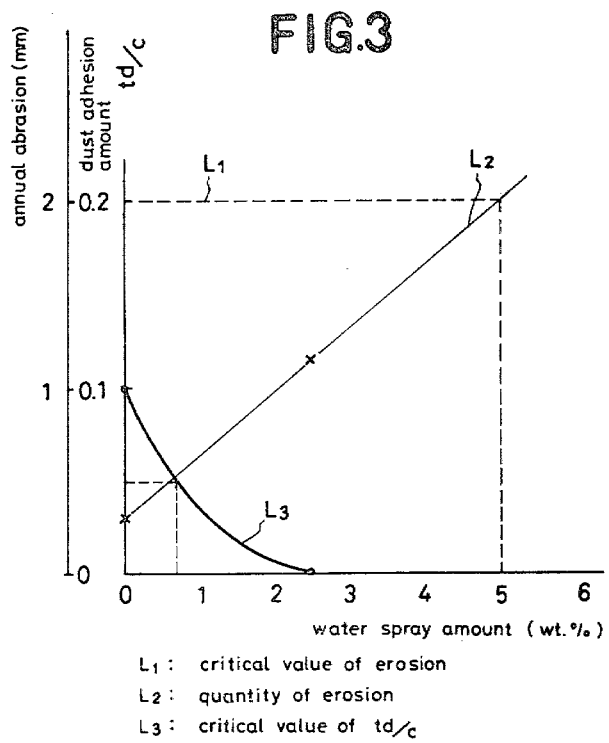
FIG. 3 is a diagram illustrating relations of the amount of sprayed of cooling water to the amount of adhering dust and the quantity of abrasion of the nozzle.

In FIG. 3, the ordinate indicates the annual abrasion (mm) of the nozzle and the amount of adhering dusts, td/c [(dust thickness)/(blade chord length)], and the abscissa indicates the amount sprayed of water (% by weight based on the gas).

When in view of actual operation results of the conventional axial-flow turbine it is presumed that the annual abrasion of the nozzle is 2 mm, the upper limit of the amount sprayed of water is 5%. When the amount (td/c) of the adhering dust is controlled to 5% so as to maintain a good operation efficiency, the lower limit of the amount sprayed of water is 0.5 to 0.7%.

In FIG. 3, line L₁ indicates the critical value of erosion, line L₂ indicates the quantity of erosion and curve L₃ indicates the critical value of the amount td/c of the adhering dust.

The amount of the dusts adhering to the nozzle has a close relation to reduction of the operation efficiency, and it is necessary to perform the operation while the amount of the adhering dust is adjusted with such a range as will not cause substantial reduction of the operation efficiency.

Figure 4:
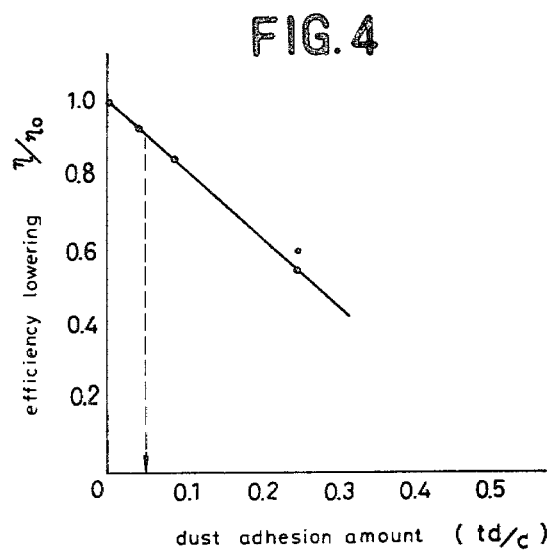
FIG. 4 is a diagram illustrating the relation between the amount of adhering dust and the efficiency of a turbine.

FIG. 4 illustrates influences of the amount of adhering dust on reduction of the efficiency. From FIG. 4, it is seen that if it is intended to control reduction of the efficiency within 10% of the initial efficiency, it is necessary to reduce the adhesion thickness of dust (td/c) below 5%.

Figure 5:
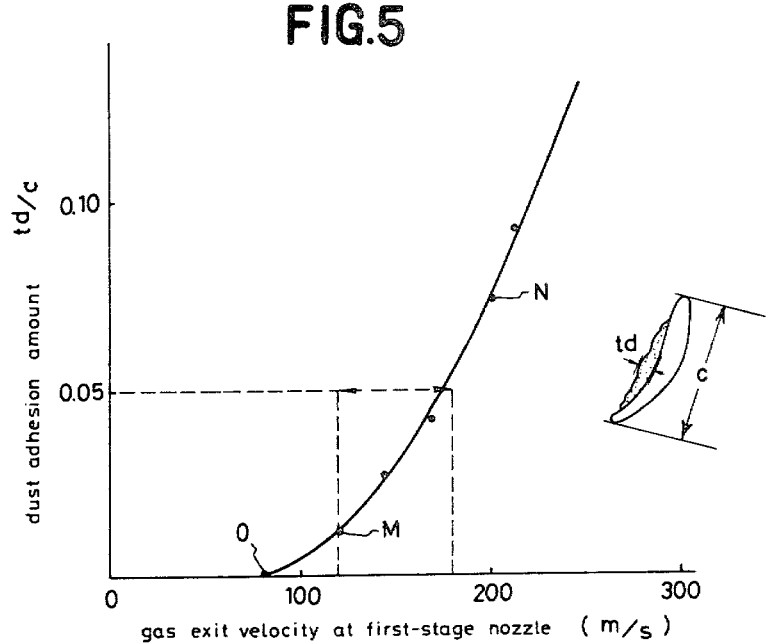
FIG. 5 is a diagram illustrating the relation between the flow-out speed of the gas from a first nozzle and the amount of adhering dust.

FIG. 5 is a diagram illustrating the relation between the thickness of dust and the flow-out speed of the gas at the nozzle of the first stage. The amount (td) of adhering dust is largest and 1.5 mm at the point M when the flow rate is 120 m/sec and the blade chord length (c) is 120 mm. When the gas flow rate is 200 m/sec and the blade chord length (c) is 200 mm, the amount (td) of adhering dust is largest and 15 mm at the point N. The point O indicates a point where the amount of adhering dust is zero or substantially zero. From data shown in FIG. 4, it is seen that it is necessary to control the adhesion thickness of dust below 5%. If it is intended to control the adhering thickness of dust below 5%, from FIG. 5 it is seen that the flow rate of the gas at the first nozzle should be lower than 180 m/sec. In order to elevate the operation efficiency of the turbine, it is necessary to elevate the flow rate of the gas jetted out from the first nozzle. Supposing that an allowable amount of the adhering dust is within 2 to 5%, the flow rate of the gas jetted out from the first nozzle is 180 to 120 m/sec, preferably 180 to 140 m/sec. In this case, an allowable flow-out angle is 46° to 60°, preferably 48° to 60°.

Figure 6:
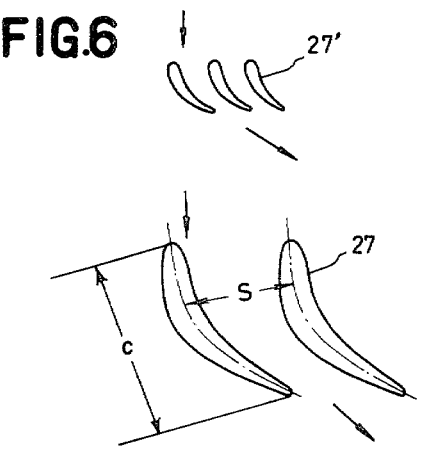
FIG. 6 is a diagram illustrating a first nozzle of the axial-flow turbine of the present invention in comparison with a first nozzle of a conventional axial-flow turbine.

FIG. 6 is a diagram illustrating a nozzle blade 27 of the axial-flow turbine of the present invention in comparison with a nozzle blade 27' of a conventional axial-flow turbine. The size of the blade 27 of the present invention is much larger than that of the conventional turbine. Such large blades are especially designed and adopted in the present invention.

Figure 7:
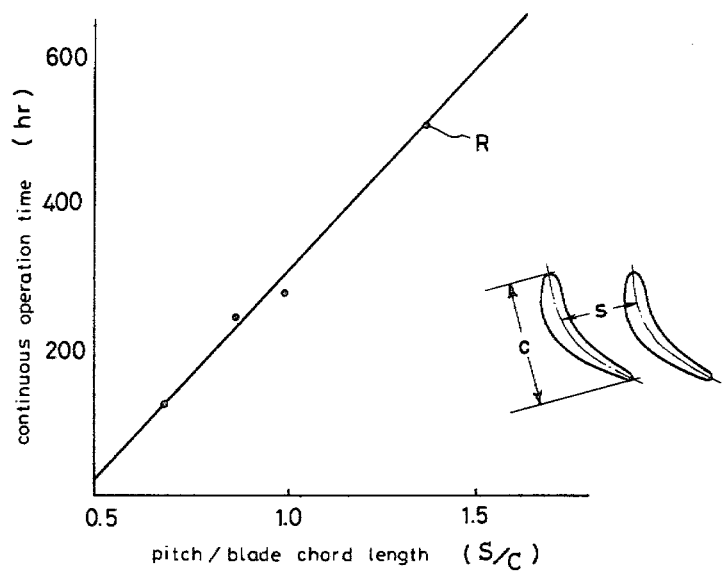
FIG. 7 is a diagram illustrating the relation between the ratio (S/C) of the nozzle pitch (S) to the blade chord length (C) and the time (hours) of the continuous operation of the turbine.

FIG. 7 shows results of experiments made to determine the blade configuration shown in FIG. 6. In FIG. 7, the abscissa indicates the ratio S/C of the pitch S (the distance between centers of two adjacent blades) to the blade chord length C, and the ordinate indicates the time of the continuous operation of the turbine (spraying of water is not effected). A relation of a straight line is established between the two factors. The point R in FIG. 7 shows the value obtained when the flow rate of the gas at the nozzle outlet is 136 m/sec and the pitch is 6 mm. From FIG. 7, it is seen that with increase of the value S/C, the operation time is prolonged. In other words, as the blade pitch is increased, the clogging of the nozzle is retarded.

Figure 8:
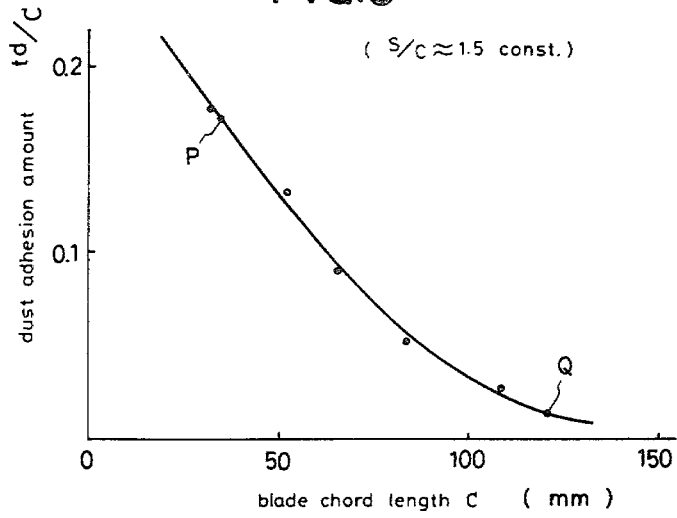
FIG. 8 is a diagram illustrating the relation between the blade chord length and the amount of dust adhering to the nozzle blade.

FIG. 8 is a diagram illustrating the relation between the adhering thickness of dust (the ordinate) and the blade chord length (the abscissa) observed when the ratio S/C is maintained at about 1.5. From FIG. 8, it is seen that with increase of the size of the blade, the dust thickness, i.e., the amount of adhering dust, is relatively decreased. In FIG. 8, the point P shows the value obtained when the chord length C is 35 mm and the flow-out speed $V_o$ of the gas is 136 m/sec, and the point Q shows the value obtained when the chord length is 120 mm and the flow-out speed is 120 m/sec.

From the foregoing experimental results, it is seen that when the size of the blade is increased, mists are allowed to flow along the blade and they are transferred sufficiently to the back face of the blade. Accordingly, the effect of washing away the dusts being adhering to the blade is attained and even if the operation is conducted for a long time continuously, clogging of the nozzle with dust can be prevented.

Figure 9:
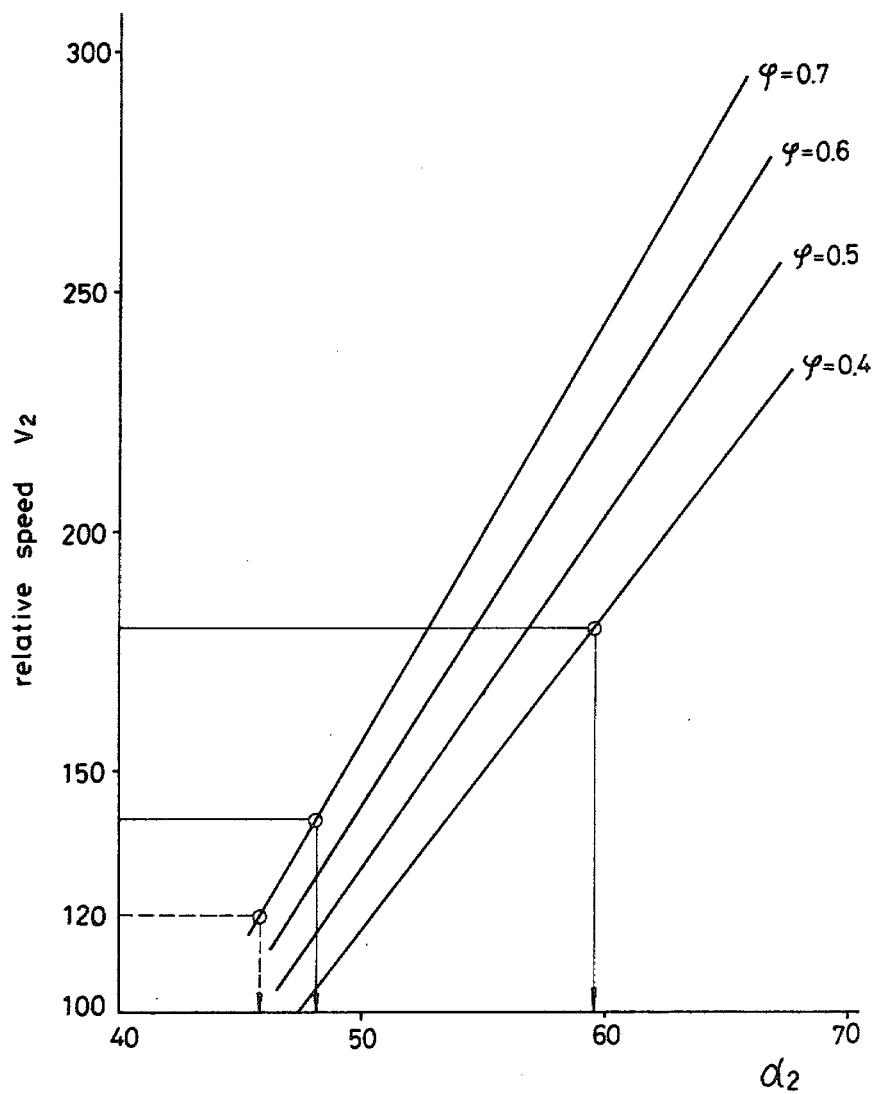
FIG. 9 is a diagram illustrating the relation between the flow-out angle $\alpha_2$ of the moving blade and the relative speed $V_2$ of the gas at the outlet of the moving blade.

FIG. 9 is a diagram illustrating the relation between the flow-out angle $\alpha_2$ (relative angle) of the moving blade (the abscissa) and the relative speed $V_2$ of the gas at the outlet of the moving blade (the ordinate). When the flow rate coefficient $\phi$ is within a range of 0.4 to 0.7 and the flow rate of 120 to 180 m/sec or 140 to 180 m/sec determined from the results shown in FIG. 5 is plotted on the ordinate and connected to the line of the flow rate coefficient $\phi$ of 0.4 to 0.7, it is seen that an appropriate flow-out angle $\alpha_2$ is in the range of about 50° to 60°.

As illustrated hereinbefore, the axial-flow turbine of the present invention is characterized in that the chord length is increased in nozzles of moving blades, especially those of the first stage (the ratio of the height to the chord length is 0.7 to 1.5), the thickness of the trailing edge portion of the blade is increased to 6 to 12 mm and the flow-out nozzle angle, flow-out speed and peripheral speed of the top end of the moving blade are made smaller than in the ordinary axial-flow turbine. By virtue of this characteristic feature, in the present invention, spraying of water is utilized most effectively to prevent adhesion and accumulation of dust on nozzles, especially those of the first stage, and the influence of erosion presumably caused by spraying of water can be controlled to practically negligible level.

Further, in the axial-flow turbine of the present invention, the flow-out speed of the gas especially at the nozzle of the first stage (the stationary blade of the first stage) is made lower than in an ordinary axial-flow turbine and adjusted to 120 to 180 m/sec, preferably 140 to 180 m/sec, the gas flow-out angle is controlled to 46° to 60° and the peripheral speed of the top end of the moving blade is adjusted to 150 to 230 m/sec. By virtue of this characteristic feature, in the present invention, the absolute speed of the gas jetted out from the nozzle and the absolute speed of the gas passing through and coming from the interior of the moving blade are arranged so that swirling streams turning around the turbine axis in the same direction are produced.

More specifically, the gas flowing in the interior of the turbine makes a swirling movement around the axis of the turbine, and when the gas thus swirls along the turbine casing, a centrifugal force is generated in the gas and by this centrifugal force dusts and mists are separated from the gas and pushed forward to the inner wall face of the gas casing.

In the present invention, accordingly, if dust discharge means is disposed on the inner wall face of the turbine casing, the dust can be effectively caught and discharged to the outside. As such dust discharge means, a groove, a slit or a hole is formed on the inner wall face of the turbine casing in the present invention.

The structure of an axial-flow turbine suitable for practising the method of the present invention will now be described by reference to the drawing.

Figure 10:
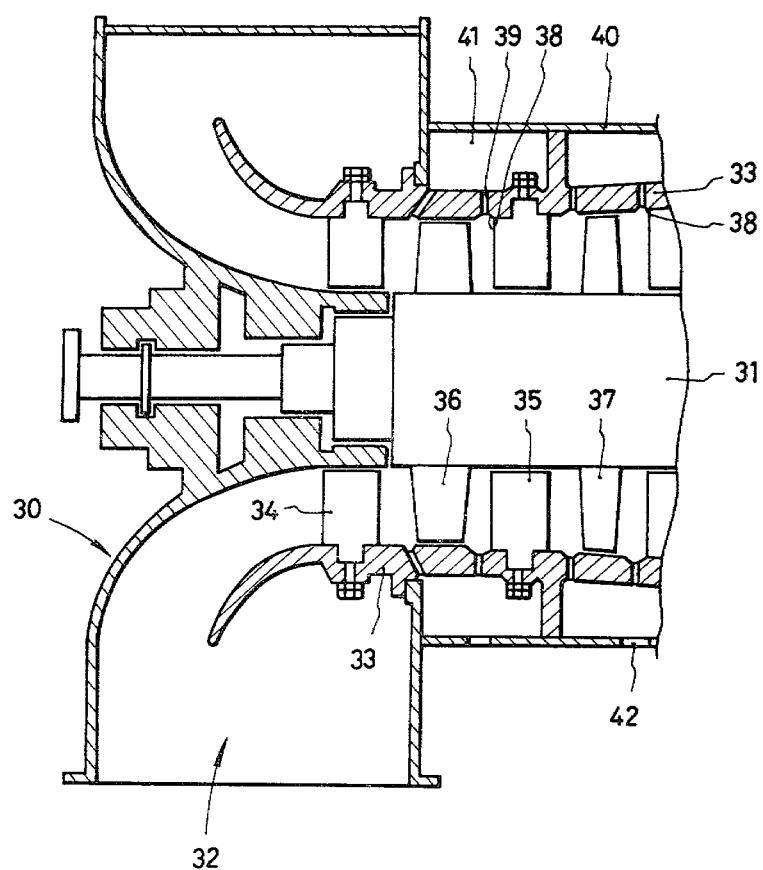
FIG. 10 is a sectional view illustrating the main part of the axial-flow turbine of the present invention.
Figure 11:
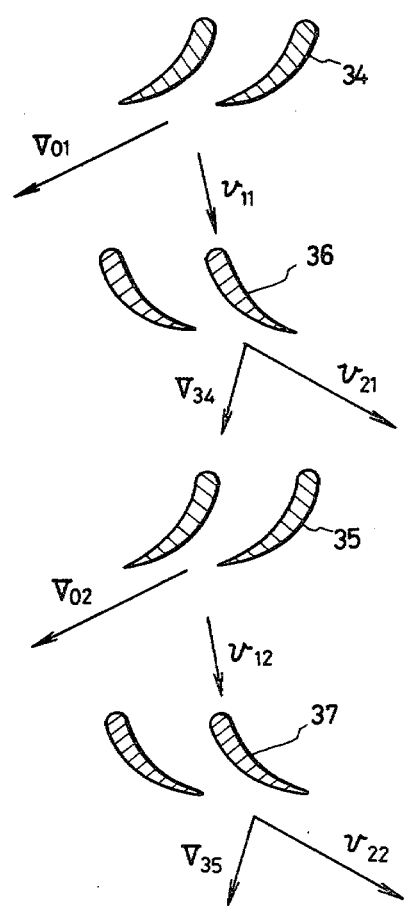
FIG. 11 is a diagram illustrating the flow-out speeds of the gas from the nozzle and the moving blade.

FIG. 10 is a sectional view showing the front stage portion of the axial-flow turbine, inclusive of a turbine shaft. FIG. 11 is a sectional view showing the configuration of the blade, and FIG. 12 is a triangular coordinate of the speed.

A rotor boss 31 is rotatably supported on the central portion of a turbine casing 30, and a gas feed opening 32 is formed on the casing 30. A first-stage nozzle 34 (stationary blade) and a second-stage nozzle 35 are disposed on the inner side of the portion 33 of the casing surrounding the above-mentioned rotor boss. A first-stage moving blade 36 and a second-stage moving blade 37 are disposed in succession on the peripheral face of the rotor boss 31.

The flow course of the gas will now be described. Referring to FIGS. 11 and 12, $V_{o1}$ and $V_{o2}$ designate the absolute speeds of the gas jetted out from the first-stage nozzle 34 and the gas jetted out from the second-stage nozzle 35, respectively, and $V_{11}$ and $V_{12}$ designate the flow-in relative speeds thereof to the moving blades 36 and 37, respectively. $V_{34}$ and $V_{35}$ represent the absolute speeds of the gas flowing out from the first-stage moving blade 36 and the gas flowing out from the second-stage moving blade 37, respectively, and $V_{21}$ and $V_{22}$ designate the flow-out relative speeds thereof to the moving blades 36 and 37, respectively.

Figure 12:
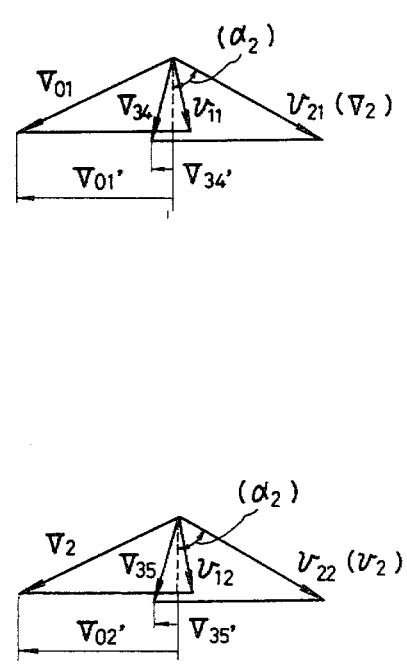
FIG. 12 is a diagram illustrating vectors of the flow-out gas speeds shown in FIG. 11.

FIG. 12 is a triangular coordinate of the speed showing the respective speed components of the gas in FIG. 11. As is seen from FIG. 12, speed components $V_{o1}'$, $V_{o2}'$, $V_{34}'$ and $V_{35}'$ of the absolute speeds $V_{o1}$ and $V_{o2}$ of the gas flowing out from the first-stage and second-stage nozzles 34 and 35 and absolute speeds $V_{34}$ and $V_{35}$ of the gas flowing out from the first-stage and second-stage moving blades 34 and 35 are arranged in the same direction with respect to the axis of the turbine. More specifically, in the present invention, the absolute speed of the gas flowing out from the nozzle and the absolute speed of the gas flowing out from the moving blade receiving said absolute speed of the gas flowing out from the nozzle are arranged so that they have speed components in the same direction with respect to the turbine axis. By this arrangment, the gas flowing in the turbine is allowed to have swirling components turning in the same direction with the axis of the turbine being as the center. More conceptually, the gas swirls spirally with the axis of the turbine being as the center and in this swirling state, the gas advances toward the discharge opening.

Figure 13:
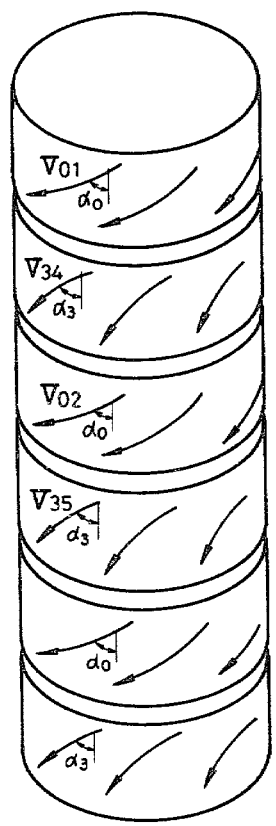
FIG. 13 is a view showing the state where swirling streams are generated in the gas flowing in the axial-flow turbine of the present invention.

FIG. 13 illustrates the arangement of the nozzles and moving blades and the flows of the gas from these nozzles and moving blades. Both absolute speeds $V_{o1}$ and $V_{o2}$ of the gas from the nozzles having a flow-out angle $\alpha_o$ and the absolute speeds $V_{34}$ and $V_{35}$ of the gas from the moving blades having a flow-out angle $\alpha_3$ are arranged in the same direction. By this arrangement, swirling flows turning in one direction are produced in the gas, and as a result, a centrifugal force is generated in the gas and dust or mists are effectively separated from the gas by this centrifugal force.

As shown in FIG. 10, grooves 38 extending in the same direction are formed on the casing 33. The groove 38 is disposed between every adjacent nozzle and moving blade or between every adjacent moving blade and nozzle. It is preferred that the groove 38 be located at such positions that properties of the turbine are not adversely affected by the presence of the grooves 38. A discharge hole 39 is opened to the bottom of the groove 38 and the discharge hole 39 is connected to a separation chamber 41 defined by the casing 33 and a cover 40 surrounding the periphery of the casing 33. A slit having the functions of the groove 38 and discharge hole 39 may be disposed instead of the groove 38.

The separation chamber 41 is connected to drain pipe or the like (not shown), and dust caught in the grooves 38 is introduced into the separation chamber 41 through the discharge holes 39 and it is included in water drops formed by condensation. Thus, the dust is collected in the lower portion of the separation chamber 41, discharged from a drain hole 42 and fed to the drain pipe through the drain hole 42.

It is in blades of the front stages that the above-mentioned specific arrangement and contrivance are made, and in the present invention, it is important that the first-stage nozzle and subsequent first-stage moving blade should be designed in the above-mentioned manner.

The first problem to be solved in operating an axial-flow turbine by utilizing a blast furnace gas is how to prevent adhesion of dust to a nozzle or moving blade of the turbine as described hereinbefore. The second problem is how to prevent or diminish erosion caused by spraying of water. In the present invention, the following contrivances are made to the axial-flow turbine.

(1) The peripheral speed of the top end of the first-stage moving blade of the axial-flow turbine is controlled to a level lower than in an ordinary axial-flow turbine and is adjusted to 250 to 150 m/sec. In general, an ordinary axial-flow turbine is designed so that the above peripheral speed is 300 m/sec or higher.

This preferred range of the peripheral speed has been determined based on results of experiments made on the relation between the peripheral speed and the degree of occurrence of erosion.

Reduction of the peripheral speed results in reduction of the relative speed of the moving blade to the gas and also in reduction of the impinging speed of mists to the moving blade. When the peripheral speed is reduced in moving blades of the front stages inclusive of the first stage is reduced and the gas flow-out speed of the nozzles of the front stages inclusive of the first stage is reduced, the work done of each stage is diminished. In this invention, however, this problem is solved by increasing the total number of stages. Thus, reduction of the operation efficiency is effectively prevented.

(2) The configuration of the blade is changed. In the axial-flow turbine of the present invention, the size and thickness of the blade are made larger than in the conventional turbine as shown in FIG. 6.

As will be apparent from comparison of the sectional shape of a blade 27' of the front stage in the conventional axial-flow turbine with the sectional shape of a corresponding blade 27 in the axial-flow turbine of the present invention, the size of the blade 27 of the axial-flow turbine of the present invention is much larger, and by this arrangement, clogging by adhesion of dust can be prevented and the influence of erosion is effectively eliminated. More specifically, in the present invention, the ratio of the blade height to the blade chord length is adjusted to 0.7 to 1.5. The value of this ratio in the conventional axial-flow turbine is ordinarily about 2 to about 3. In the present invention, the value of this ratio is extremely low. In short, a stocky blade having a large size is used in the present invention. In the conventional axial-flow turbine, the trailing edge of the blade is thin and ordinarily about 1 to about 2 mm. In the present invention, since a blade having a long chord length is adopted, even the trailing edge is formed to have a thickness of about 6 to about 12 mm. By this arrangement, erosion can be effectively eliminated in the present invention.

(3) The speed of the gas jetted from the gas is reduced. In order to revent adhesion of dusts, the speed of the gas jetted from the first nozzle is lowered to 120 to 180 m/sec, preferably 140 to 180 m/sec, and with this reduction of the gas speed, the relative speed of the gas to the moving blade is simultaneously reduced. Thus, not only the effect of preventing adhesion of dust but the effect of diminishing erosion can be attained in the present invention.

(4) Mists are discharged promptly. With spraying of water and work in the first stage, the temperature of the gas is lowered, and water in the gas is accordingly condensed. As pointed out hereinbefore, this water being condensed has a function of catching dust, but occurrence of erosion is promoted with increase of the amount formed of water mists.

As means for overcoming this disadvantage, a groove or slit is formed on the turbine casing as shown in FIG. 9 to catch mists and dust and discharge them outside the turbine. Further, since swirling motions are given to the gas as shown in FIGS. 11 to 13, mists generated with lowering of the gas temperature are effectively separated from the gas and discharged from the interior of the turbine, and therefore, occurrence of erosion can be effectively prevented.

In general, dust in the gas is removed in the front stages of the turbine, but in some case, dust intrudes even into a labyrinth disposed for preventing leakage of the gas. When dust intrudes into the the labyrinth portion and adhere and accumulate in this portion, the sealing effect is degraded. Therefore, it is necessary to prevent intrusion of dust in the labyrinth portion. For this purpose, it is preferred to adopt a method in which an inert gas or water vapor maintained at a pressure slightly higher than the pressure of the gas is introduced in the labyrinth portion. Thus, intrusion of the dust-containing gas into the labyrinth portion can be effectively prevented.

In the present invention, by virtue of the above-mentioned structural arrangement, dusts in the exhaust gas can be effectively removed, and occurrence of erosion can be prevented, whereby the axial-flow turbine can be effectively prevented from being worn away and damaged. The characteristic features of the present invention which have been described hereinbofore will now be summarized.

The first characteristic feature is that in recovering energy from a blast furnace exhaust gas by utilizing an axial-flow turbine, the blast furnace exhaust gas is first treated in a wet dust precipitator to convert the gas to a saturated gas and prior to introduction of the saturated gas into the axial-flow turbine, cooling water maintained at a temperature lower than the temperature of the gas is sprayed to the saturated gas in an amount corresponding to 0.5 to 5% by weight of the flow rate of the gas.

The amount sprayed of water is adjusted in such a range that adhesion of dust to nozzles, especially the first-stage nozzles, is prevented and occurrence of erosion of the nozzles and moving blades is controlled to a level assuring safe operation.

By spraying of cooling water, the dust is surrounded by thin films of water which have a cushioning action effective for preventing the dust from adhering to the nozzles and the like. Further, the size of the generated mists is as small as the particle size of the dust, and therefore, the mists travel along a course quite similar to the flying course of the dust and flow along the blade face, whereby the dust adhering to the nozzles can be effectively removed by these mists.

The second feature of the present invention is that an axial-flow turbine to be used for recovery of energy from a blast furnace exhaust gas is designed to have a peculiar structure. Further, dimensions of nozzles and moving blades of the front stages, especially those of the first stage, are increased so that adhesion of dust is not substantially caused and even if erosion be to take place, safe operation can be guaranteed.

Specific structural features of the axial-flow turbine of the present invention are summarized below.

(A) In nozzles, especially the first-stage nozzle, the flow-out speed of the gas is adjusted to 140 to 180 m/sec and the flow-out angle (turning angle) is adjusted to 50° to 60°. As is seen from FIG. 5, if the flow-out speed is in a range adopted in a customary axial-flow turbine (200 m/sec or hither), the amount of adhering dust is increased. In the present invention, the flow-out speed is reduced to the above-mentioned level, adhesion of dust can be effectively prevented.

(B) At least the nozzle and moving blade of the first stage are formed to have shape in which the ratio of the blade height to the blade chord length is adjusted to 0.7 to 1.5.

As is seen from FIG. 7, as the blade pitch/chord length ratio (S/C) is increased, the continuous operation time of the axial-flow turbine can be prolonged. Further, as seen from FIG. 8, as the blade chord length (C) is increased, the amount of adhering dust is drastically diminished. Based on such experimental results as shown in FIG. 8, the axial-flow turbine is designed and arranged so that adhesion of dust is not substantially caused.

Simultaneously with such increase of dimensions of blades, the thickness of the trailing edge is increased to 6 to 12 mm in at least the nozzle and moving blade of the first stage, and by this arrangement, the resistance of the nozzle and blade to erosion can be remarkably improved.

(C) The peripheral speed of the top end of the moving blade is reduced to 150 to 180 m/sec in the first stage of the axial-flow turbine. In case of an ordinary axial-flow turbine, the peripheral speed of the top end of the moving blade of the first stage is 300 m/sec or higher. In the present invention, by reducing this peripheral speed to the above-mentioned level, the operation efficiency can be maintained at a high level even though the flow-out speed of the gas at the nozzle is lowered.

Incidentally, although the speed of the gas flowing out from the nozzles is lower than in an ordinary axial-flow turbine, reduction of the operation efficiency is prevented by increasing the number of the stages.

(D) A slit or groove crossing the turbine axis at a right angle is formed on the inner face of the periphery of the gas passasge of the axial-flow turbine, whereby swirling streams are produced in the gas and separation of dust and mists of from the gas is remarkably promoted. The thus separated dust and mists are discharged through this slit or groove.

When low-temperature water is sprayed to the gas saturated with water vapor, as the energy is lost from the gas, water vapor is condensed and mists are generated. In the present invention, the so generated mists are collected to the periphery of the gas passage by the centrifugal force generated by the swirling movement of the gas, and therefore, the mists are positively caught and discharged to the outside. As a result, erosion can be effectively prevented, and the capacity of the turbine is stabilized and improved and the life of the turbine is remarkably prolonged.

(E) As will be apparent from the foregoing illustration, according to the present invention, the axial-flow turbine that is used for recovering energy from a blast furnace exhaust gas is constructed so that adhesion of dust is not substantially caused and mists and dust are effectively discharged promptly. As a result, the above-mentioned various effects and advantages can be attained. Further, the operation efficiency can be improved by at least 10% over a centrifugal turbine, and the equipment expenses can be remarkably reduced. Also the energy recovery ratio is high. Therefore, the present invention is very advantageous from the economical viewpoint.

In addition, the following advantages can be attained according to the present invention.

When compared with an ordinary axial-flow turbine, the axial-flow turbine of the present invention is advantageous in that since complete removal of dust from a blast furnace exhaust gas and heating of the exhaust gas need not be conducted prior to introduction of the gas into the turbine and hence, the equipment expenses can be remarkably saved.

When water for continuous spraying to the saturated gas is supplied from the same system as that for feeding water to a wet dust precipitator, the structure of the apparatus can be simplified.

The present invention is advantageous also in the point that the gas discharged from an outlet of a wet dust precipitator customarily used for a blast furnace can be directly used as it is.

What is claimed is:

1. A method for recovering energy from high pressure exhaust gases containing dust by utilizing an axial-flow turbine, said method comprising saturating a high pressure exhaust gas containing dust with water vapor, adding additional water maintained at a temperature lower than the temperature of the saturated gas to said saturated gas by continuous spraying in an amount corresponding to 0.5 to 5% by weight of the flow rate of the saturated gas upstream of an axial-flow turbine to cool the saturated gas and form a sufficient amount of mists in the gas by condensation of water vapor, and feeding the gas to the axial-flow turbine.

2. A method for recovering energy from an exhaust gas as set forth in claim 1 further comprising controlling the speed of the gas flowing out from a nozzle to 140 to 180 m/sec and the turning angle of the gas flowing out from the nozzle to 50° to 60°.

3. A method for recovering energy from an exhaust gas as set forth in one of claims 1 or 2 further comprising controlling the peripheral speed of the top end of a moving blade of the first stage in the axial-flow turbine to 150 to 230 m/sec.

4. A method for recovering energy from an exhaust gas as set forth in claim 1 wherein in the axial-flow turbine the gas flow-out speed at the nozzle outlet is made in agreement with the gas flow-out speed at the moving blade outlet so that swirling streams turning in the same direction are always produced in the gas.

5. A method for recovering energy possessed by a high pressure exhaust gas containing dust and mist by use of an axial-flow turbine comprising the steps of:
  saturating the gas with water vapor;
  continuously spraying water to the steam-saturated gas at a location upstream of the axial-flow turbine in the flow direction of the gas, said water being maintained at a temperature lower than the temperature of the steam-saturated gas and sprayed in an amount within a range of 0.5–5% by weight of the steam-saturated gas, thereby producing flows of steam-saturated gas containing condensed mist;
  supplying the flows of gas to the axial-flow turbine in a manner such that the exit velocity and the exit angle of flows of gas at the stator blade at the first blade stage are controlled at a value below 200 m/s and a value between 50° and 60°, respectively;
  thereby imparting velocity components of an identical direction relative to the shaft of the axial-flow turbine to flows of gas from all stator blades and rotor blades of the turbine;
  thereby making the gas flows swirling with the turbine shaft as the axis of the swirling; and
  thereby centrifugally separating the dust and mist contained in the gas.

6. The method as claimed in claim 5 wherein the rotor blade at the first blade stage of the axial-flow turbine is rotated at a top-end peripheral velocity within a range of 150 to 230 m/s.

7. The method as claimed in claim 5 wherein the flow-out directions of gas flows from the stator blade and gas flows from the rotor blade are controlled to be identical to thereby constantly impart flows of gas swirling velocity components of an identical direction.

* * * * *